(12) United States Patent
Goodman

(10) Patent No.: US 6,704,824 B1
(45) Date of Patent: Mar. 9, 2004

(54) UNIVERSAL SERIAL BUS ADAPTER WITH AUTOMATIC INSTALLATION

(75) Inventor: David D. Goodman, Arlington, VA (US)

(73) Assignee: Inline Connection Corporation, Washington, DC (US)

(*) Notice: Subject to any disclaimer, the term of this patent is extended or adjusted under 35 U.S.C. 154(b) by 197 days.

(21) Appl. No.: 09/619,958

(22) Filed: Jul. 20, 2000

Related U.S. Application Data
(60) Provisional application No. 60/145,836, filed on Jul. 27, 1999.

(51) Int. Cl.[7] .............................................. G06F 13/00
(52) U.S. Cl. ........................... 710/300; 710/8; 710/10; 710/100; 710/104; 710/305; 713/1; 713/2; 713/100; 709/1; 709/221; 709/311; 703/24; 717/174; 717/175; 717/176; 717/177; 717/178
(58) Field of Search ............................. 710/100, 8, 10, 710/300, 305, 104; 713/1, 2, 100; 717/174–178, 121; 709/1, 221, 311; 703/24

(56) References Cited

U.S. PATENT DOCUMENTS

| | | | | |
|---|---|---|---|---|
| 4,649,479 A | * | 3/1987 | Advani et al. .................. 709/1 |
| 4,975,829 A | * | 12/1990 | Clarey et al. .................. 703/24 |
| 5,155,847 A | * | 10/1992 | Kirouac et al. ............. 709/221 |
| 5,247,683 A | * | 9/1993 | Holmes et al. .............. 709/221 |
| 5,367,686 A | * | 11/1994 | Fisher et al. ................. 717/174 |
| 5,559,965 A | * | 9/1996 | Oztaskin et al. ............. 710/104 |
| 5,655,148 A | * | 8/1997 | Richman et al. ................ 710/8 |
| 5,664,195 A | | 9/1997 | Chatterji |
| 5,701,476 A | | 12/1997 | Fenger |
| 5,715,463 A | | 2/1998 | Merkin |
| 5,717,930 A | * | 2/1998 | Imai et al. .................... 717/176 |
| 5,742,829 A | * | 4/1998 | Davis et al. ................. 717/178 |
| 5,752,032 A | * | 5/1998 | Keller et al. ................. 709/311 |
| 5,802,363 A | * | 9/1998 | Williams et al. ................ 713/2 |
| 5,802,365 A | | 9/1998 | Kathail et al. |
| 5,819,115 A | | 10/1998 | Hoese et al. |
| 5,842,024 A | * | 11/1998 | Choye et al. ................ 717/178 |
| 5,867,730 A | | 2/1999 | Leyda |
| 5,951,684 A | | 9/1999 | Jeon |
| 5,995,757 A | * | 11/1999 | Amberg et al. ............. 717/175 |
| 6,009,480 A | | 12/1999 | Pleso |
| 6,023,585 A | | 2/2000 | Perlman et al. |
| 6,081,850 A | | 6/2000 | Garney |
| 6,154,836 A | * | 11/2000 | Dawson et al. ................. 713/1 |
| 6,185,630 B1 | * | 2/2001 | Simmons ..................... 710/10 |
| 6,543,047 B1 | * | 4/2003 | Vrhel et al. .................. 717/121 |

* cited by examiner

Primary Examiner—Gopal C. Ray
Assistant Examiner—Justin King
(74) Attorney, Agent, or Firm—Hale and Dorr LLP

(57) ABSTRACT

A peripheral device and a method for operating the peripheral device for automatic installation, in which the method includes coupling the peripheral device to a computer and sending a first device identification from the peripheral device to the computer. The peripheral device emulates a device of a type determined by the first device identification, including transferring a driver from the peripheral device to the computer. Then, the peripheral device sends a second device identification from the peripheral device to the computer, such that the sent device identification is for a device supported by the driver transferred to the computer. The peripheral device is then operates by interacting with the driver on the computer.

20 Claims, 4 Drawing Sheets

UNIVERSAL SERIAL BUS ADAPTER WITH AUTOMATIC INSTALLATION

CROSS-REFERENCE TO RELATED APPLICATIONS

This application claims the benefit of U.S. Provisional Application No. 60/145,836 filed Jul. 27, 1999, which is incorporated herein by reference.

BACKGROUND

This invention relates to an automatic installation of a communication adapter for a computer.

"Universal Serial Bus" (USB) refers to a particular standard that has been adopted by the electronics industry for establishing a communication between a computer and a number of peripheral devices. A full description of the USB standard can be found in "Universal Serial Bus Specification Revision 1.1" dated Sep. 23, 1998 and available from the USB Implementers Forum, Inc. The USB provides 12 megabit per second digital communication over standardized five-conductor cables, which connect devices that are less than 20 feet apart, and also provides limited power connections between devices. One of the most important applications for USB communication is the connection ordinary personal computers, such as Microsoft Windows® based personal computers, with peripheral equipment including input/output devices such as keyboards, and communication devices such as modems and Ethernet network interface adapters.

The USB standard not only dictates low-level communication characteristics, but also specifies how a USB-compliant device identifies itself to a host computer to which it is connected. In particular, when a USB device is attached to a computer, a startup protocol is defined in which the host computer receives information about the device.

For the host computer to make use of the functionality of the USB device, it generally requires software that is specific to that device, or at least specific to class of devices to which that device belongs and which share a common generic interface. This software is typically referred to as "driver" software. For example, if a pointing mouse connects to the USB port of a host computer, the host computer must understand that the data it inputs through the port must be used to control the movement of a pointer across the computer display. It must therefore relay this data, in the correct form, to the part of a governing program, typically an operating system, which controls these movements.

Referring to FIG. 1, when a USB device, such as a communication adapter 110, is first attached to an interface 154 on a computer 150, the operating system executing on that computer typically determines whether it has available the appropriate driver software for that device in its storage 156 based on the identification of the device it receives over the USB connection. If it does not, the operating system may request that the user insert a removable storage 160, such as a floppy disk, that has the driver so that it can be installed onto computer 150. This procedure is typically used on the Microsoft Windows® 98 operating system. Communication adapter 110 then provides communication services using the driver for communicating between computer 150 and other computers on a communication system 120, such as the Internet.

Drivers for some devices are preloaded on certain operating system. For example, a generic keyboard driver, which supports keyboards from a variety of manufacturers, may already be loaded. If such a driver is loaded, when a USB keyboard is attached to the host computer, the user may not have to supply a specific driver for the keyboard if it is compatible with the generic driver.

SUMMARY

In situations in which the operating system of a host computer does not have a suitable driver already available for a USB, using prior approaches, a user may be asked to insert a disk containing the driver so that it can be loaded. In certain situations, the user may not have such a disk. In a general aspect, the invention is a method for coupling a USB device, in particular coupling a USB device which provides an Ethernet interface, to a host computer without necessarily requiring that a driver for that USB device be already available to the computer or requiring that the user provide a disk with the driver. The method includes the USB device emulating another type of device, such as keyboard device, for which the host computer does have a suitable driver and passing a driver for the device over the USB interface to the computer while emulating the device. After the driver is loaded onto the computer, the devices makes use of the driver to operate in its native made rather than emulating another device.

In one aspect, in general, the invention is a method for operating a peripheral device. The method includes coupling the peripheral device to a computer and sending a first device identification from the peripheral device to the computer. The method then includes emulating a device of a type determined by the first device identification, including transferring a driver from the peripheral device to the computer. Then, the peripheral device sends a second device identification from the peripheral device to the computer, such that the sent device identification is for a device supported by the driver transferred to the computer. The peripheral device is then operate by interacting with the driver on the computer.

The invention can include one or more of the following features.

Sending the first device identification includes sending an identification of a keyboard device.

Transferring the driver to the computer includes emulating keystrokes for enterring data on the computer.

Operating the peripheral device to interact with the driver includes providing communication services between the computer and a communication system.

Providing communication services includes passing Ethernet signals between the peripheral device and the communication system.

Coupling the peripheral device to the computer includes establishing communication between the peripheral device and the computer according to a Universal Serial Bus (USB) standard.

Sending the first device identification includes sending an identification of a storage device.

Transferring a file from the storage device to the computer.

In another aspect, in general, the invention is a peripheral device. The device has an interface for coupling the peripheral device to a computer, and a processor. The processor is programmed (a) to emulate a first type of device, (b) to transfer a driver for a second type of device through the interface to the computer while emulating the first type of device, and (c) to operate as the second type of device after transferring the driver to the computer.

The device can include one or more of the following features:

The interface includes a Universal Serial Bus interface.

The first type of device is a keyboard device.

The first type of device is a storage device.

The second type of device is a communication adapter.

The second type of device comprises an Ethernet communication adapter.

The invention has an advantage of neither requiring a specific device driver to be preloaded on the computer to use the USB device nor requiring that the user supply a disk with such a driver. For example, a hotel may equip each room with a cable to which guests can connect their laptop computers, and over which the computer can communicate over the Internet. A guest connects a USB device between his computer and the cable to provide provides an interface to the Internet. For example, if communication over the cable is according to the Ethernet standard, the USB device can be a USB Ethernet adapter that operates according to the present invention. According to the present invention, the guest does not have to manually install software on the computer, a procedure that may be time consuming, prone to errors, or beyond the expertise of the guest.

DESCRIPTION

Figure 1:
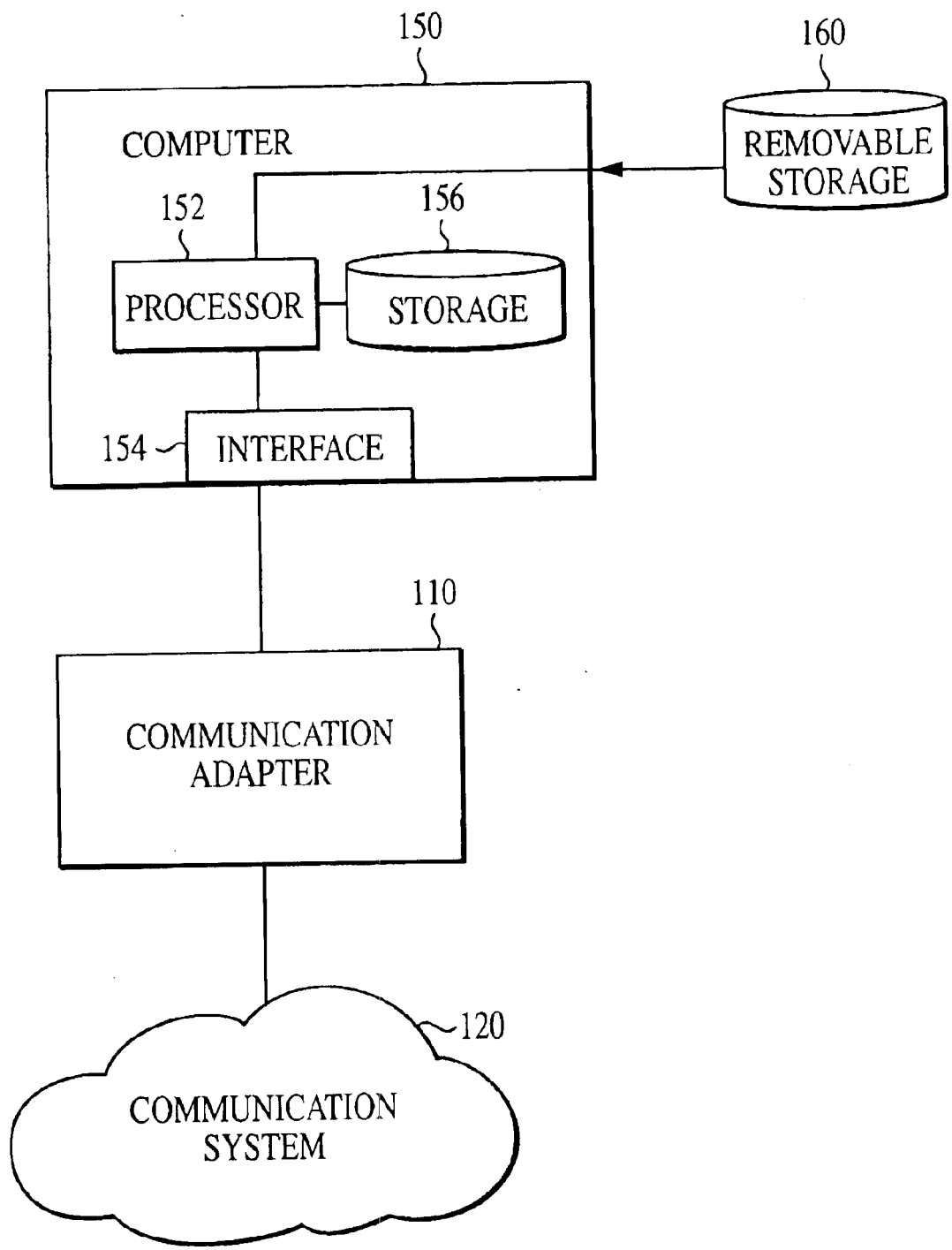
FIG. 1 is a block diagram that illustrates a prior approach to configuring a peripheral device.
Figure 2:
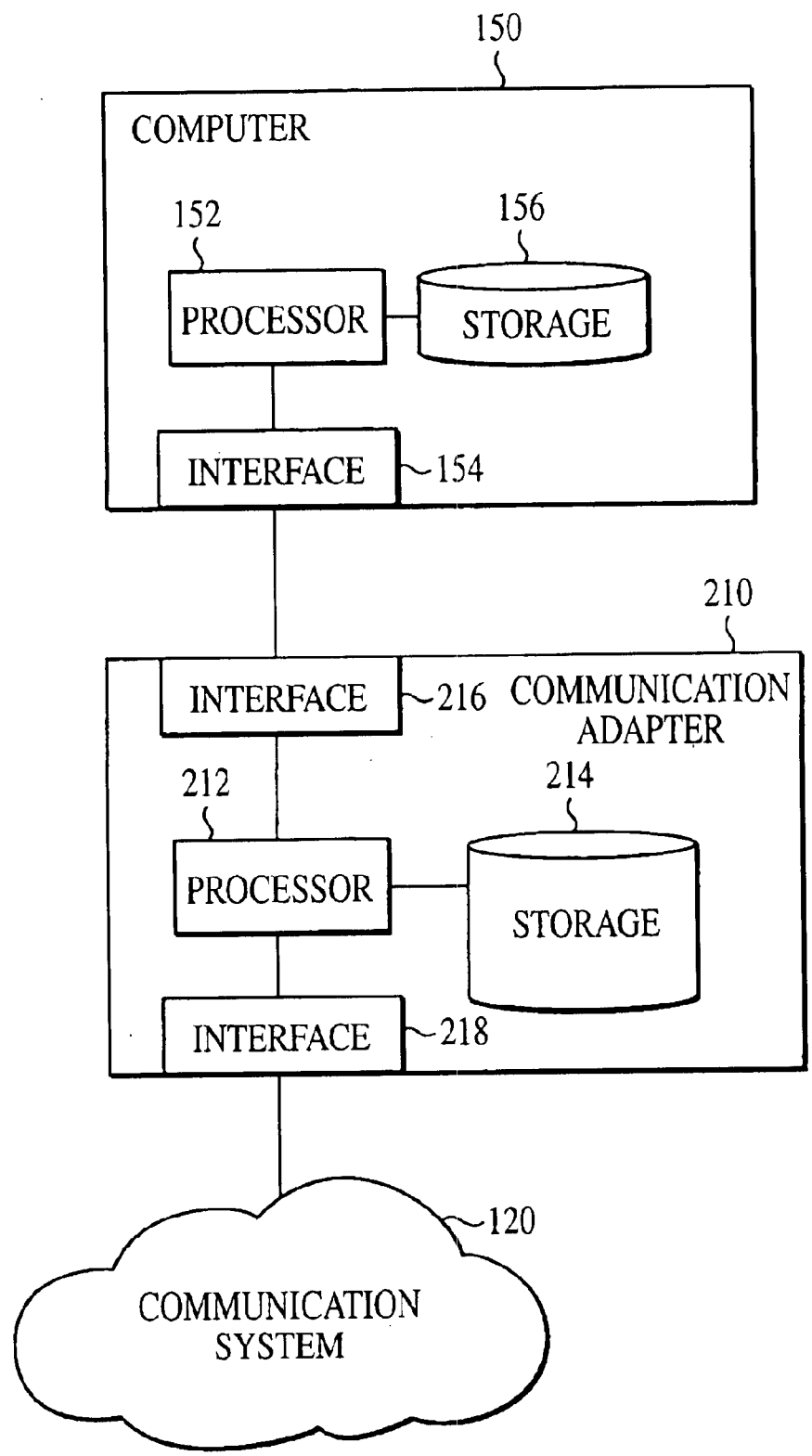
FIG. 2 is a block diagram that illustrates the present approach to configuring a peripheral device.

Referring to FIG. 2, computer 150 has an interface 154 for connecting peripheral devices, such as communication adapter #0210, to the computer. In this embodiment, interface 154 is a USB interface. In alternative embodiments, the present approach can be used with different types of interfaces. Initially when communication adapter 210 is connected to interface 154, computer 150 does not necessarily have suitable drives in its storage 156 to operate communication adapter 210 in its native mode. Communication adapter 210, when operating in its native mode, provides a communication interface between computer 150 and a communication system 120. Communication adapter 210 is coupled to communication system 120 using an Ethernet standard, and communication system 120 includes a wiring network in a building that provides a communication link between computer 150 and the Internet. In alternative embodiments, communication adapter 210 does not necessarily use an Ethernet standard for communicating over communication system 120. In yet other alternative embodiments, other types of peripheral devices that are not communication adapters are configured using the present invention.

Communication adapter 210 includes an interface 216 for communicating with computer 150. Interface 216 is a USB interface. Communication adapter 210 also includes an interface 218 for communicating with communication system 120. Interface 218 is an Ethernet interface. Communication adapter 210 also includes a processor 212, such as a micro-controller, and a storage 214, such as a read-only semiconductor memory. Storage #0214 holds software instructions that are executed by processor 212. Generally, the instructions allow communication adapter 210 to operate in two operating modes. In a first operating mode, communication adapter 210 emulates a common peripheral device for which a driver is already loaded in storage 156 on computer 150. In a second operating mode, a "native" mode, communication adapter 210 provides communication services that allow computer 150 to communicate over communication system 120. In this embodiment, in the first operating mode, communication adapter 210 emulates a standard USB keyboard for which a driver is preloaded onto the Windows® 98 operating system.

Figure 3:
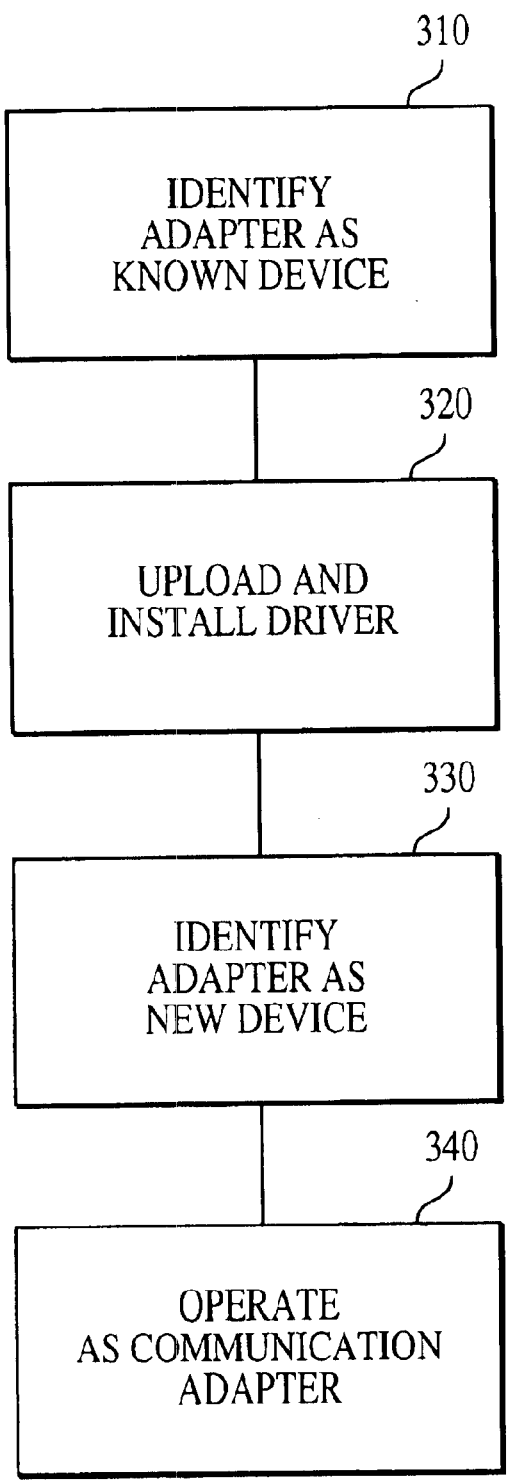
FIG. 3 is a flowchart of operation of a peripheral device.

Referring to FIG. 3, when communication adapter 210 is initially connected to computer 150, the adapter makes use of the DC power that is available on the cable connecting to the computer. Processor 212 starts up emulating a known device. As part of that emulation, processor 212 sends data to computer 150 according to the USB standard that identifies the adapter as a USB-based keyboard (step 310). The data that it sends is stored in storage 214 either in conjunction with software instructions for controlling this first operating mode, or as a separate data block.

After computer 150 receives the data that identifies communication adapter 210 as a keyboard, the computer communicates with communication adapter 210 as if the adapter were actually a keyboard.

After sending the initial data, processor 212 waits until enough time has passed for computer 150 to configure itself to communicate with the adapter. At that time, communication adapter 210 essentially has as much power to control computer 150 as an individual has seated at a keyboard. Communication adapter 212 uses these capabilities to upload a driver for its native operating mode on computer 150 (step 320).

Uploading of the driver (step 320) is performed as follows. Processor 212 first sends out a character code that would be sent by a keyboard if the "escape" key is pressed and released while the "control" key is held down. It then sends out a character code that would be sent if an "r" is pressed. This sequence of character codes invokes a "run" panel of Windows® 98 which is being executed by processor 152 on computer 150. Under Windows® 98, this effect does not depend on what application software computer 150 is currently executing.

After invoking the run panel, processor 212 sends out character codes that correspond to the keystroke sequence, "c:\windows\command.com" followed by the "enter" key. Computer 150 responds by opening up a "dos" window.

At this point, processor 212 sends the character codes that correspond to the keystroke sequence "debug" followed by "enter." In response, processor 152 on computer 150 begins to execute the standard "debug" program, which is preloaded on storage 156. Using "debug," it is generally possible for a computer operator to type in a data file of arbitrary length and content, store this file on the computer disk, and assign its any particular name in the disk directory. As a result of communication adapter 210 emulating a keyboard, processor 212 also has the ability to upload a file.

Processor 212 then uploads a driver file by sending suitable character codes that correspond to inputting the contents of the driver file for processing by the "debug" program.

After placing the driver file on storage 156, controller 212 communicates with interface 154 according to USB standard in such a manner that interface 154 acts as if a new device was connected to it. A USB interface provides a connection for multiple peripheral devices, and therefore does not require communication adapter to be lo physically disconnected and reattached. Processor 212 then signals to computer 150 that that a USB-Ethernet adapter has been connect (step 330), and optionally, that indicate that the keyboard it was emulating has been disconnected. Processor 212 identifies itself as a type of communication adapter such that the operating system executing on computer 150 finds the driver that was previously uploaded by the communication adapter without requiring intervention by the operator.

Communication adapter 210 then operates in its native mode providing communication services between computer 150 and communication system 120.

In an alternative embodiment, rather than uploading an entire driver file using the "debug" program, processor 212 uploads a bootstrap program, and then executes the bootstrap program on computer 150. The bootstrap program, which executes on computer 150, communicates with communication adapter 210 to retrieve the driver. In order to support communication between the bootstrap program executing on computer 150 and communication adapter 210, communication adapter additionally emulates a USB-based storage device, such as a CD-ROM, and the bootstrap copies the driver file from the emulated CD-ROM to the computer's storage. This approach may be faster than the first embodiment in which the entire driver is transferred using the "debug" program since it involves less overhead of emulating a keyboard. This approach relies on computer 150 including a suitable driver on its storage 156 for supporting an external USB-based CD-ROM drive.

In alternative embodiments, communication adapter 210 emulates other types of devices in order to upload a driver for its native mode. In one alternative embodiment, communication adapter 210 emulates a CD-ROM drive. A feature of the Windows® 98 operating system is that a CD-ROM disk can include a program that is automatically invoked by the operating system when the disk is inserted into a CD-ROM drive. In particular, a file named "autorun.inf" provides information to the operating system that identifies a program file that is to be executed when the disk is inserted. In this alternative embodiment, communication adapter 210 identifies itself as an external USB-based CD-ROM drive, in a manner that is similar to its identifying itself as an external USB-based keyboard in the previously described embodiments. Rather than emulating keystrokes, communication adapter 210 emulates a disk being inserted into the drive, and then emulates processing of requests from computer 150 to read the "autorun.inf" file and to read the program that is to be executed. This bootstrap program then transfers the driver to the computer's storage.

Other alternative types of devices may be emulated. If the emulated device has a provision for executing an externally-provided program on computer 150, an approach of the type described above can be used.

The embodiments described above make use of the Microsoft Windows® operating system. In alternative embodiments, communication adapter 210 includes software in storage 214 that is adapted to different and possibly multiple operating systems. Communication adapter 210 detects which operating system is used by computer 150 during the initial USB standard exchange, and performs suitable emulation and driver uploading procedures for that operating system.

In alternative embodiments, storage 214 is writeable, and is updated from a server over communication system 120. In yet other embodiments, software is transferred over communication system 120 when it is needed and stored temporarily on storage 214.

Figure 4:
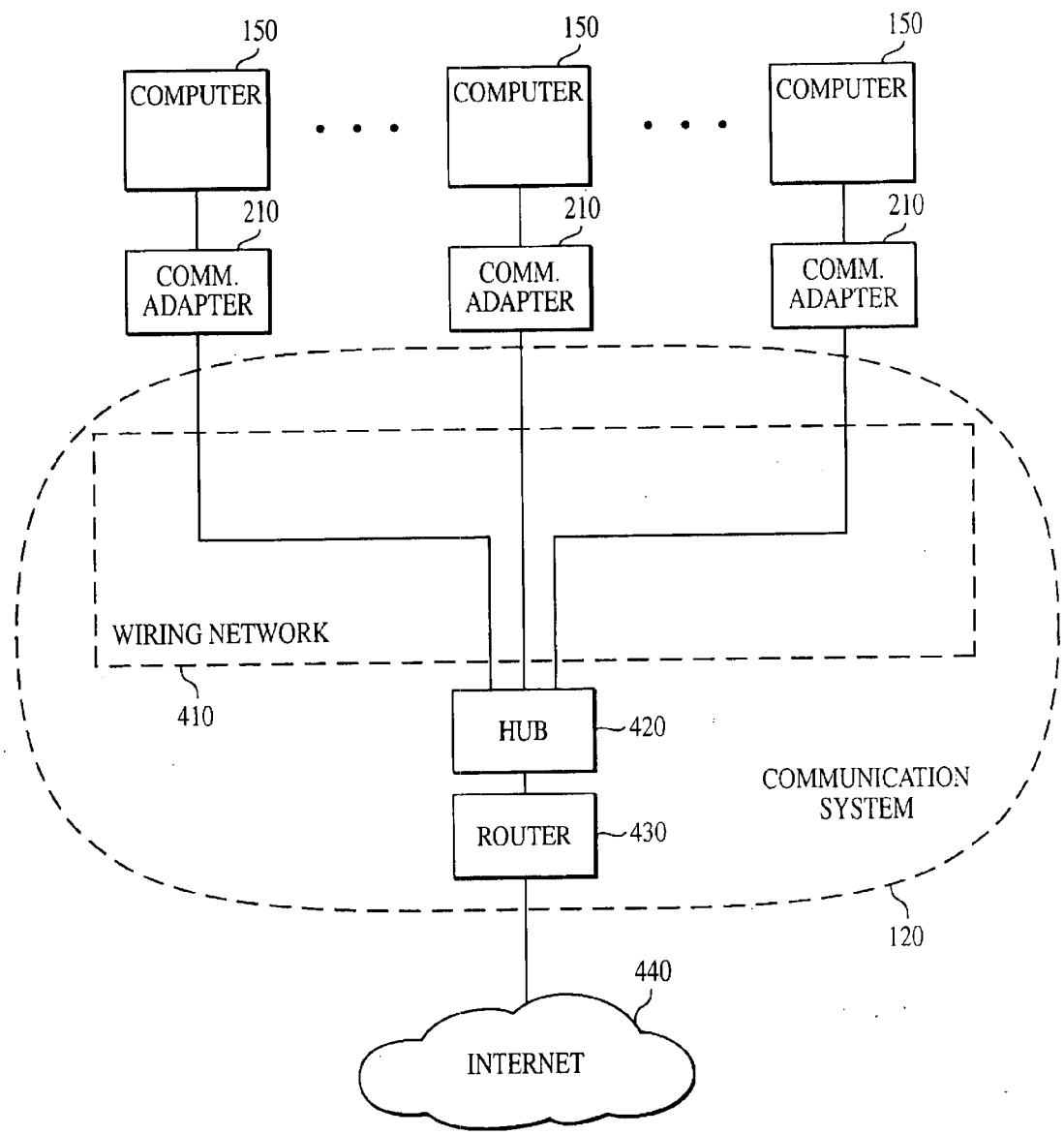
FIG. 4 illustrates multiple computers coupled through communication adapters to a communication system and to the Internet.

Referring to FIG. 4, an application of communication adapters 210 of the types described above is in a hotel communication system. A wiring network 410, such as a twisted pair wiring network, which may be shared with ordinary telephone communication, links a hub 420 and each of a number of rooms. Each room includes a jack into which communication adapter 210 can be plugged. Hub 420 is coupled to a router 430 that provides a communication link to Internet 440. In one embodiment, hub 420 and router 430 are located in a telephone wiring closet from which wiring network 410 runs to the hotel rooms.

In alternative embodiments, communication adapter 210 does not necessarily communicate with hub 420 using an Ethernet standard. Alternative signaling techniques may be used for passing data over one of two pairs of wires used for active telephone communication or for passing communication over other transmission paths, such as coaxial cable or using wireless transmissions.

It is to be understood that the foregoing description is intended to illustrate and not to limit the scope of the invention, which is defined by the scope of the appended claims. Other embodiments are within the scope of the following claims.

What is claimed is:

1. A method for automatic installation of a driver for a peripheral device in a computer, comprising:

emulating a keyboard comprising transmitting an identification of the keyboard across an interface;

receiving the identification of the keyboard, using a driver retrieved from storage to establish communication with the keyboard across the interface;

emulating keystrokes issued by the keyboard, thereby controlling the computer in a manner that causes the computer to store a driver for a second device;

transmitting, by the peripheral device, an identification of the second device across the interface, and operating the peripheral device as the second device;

receiving the identification of the second device; and using the driver for the second device to establish communication, across the interface, with the second device.

2. The method of claim 1, further comprising:

transferring an identification of a mass storage device across the interface, emulating the mass storage device, wherein the emulated keystrokes causes transmission of the driver of the second device across the interface; and using a mass storage device driver retrieved from storage to establish communication, across the interface, with the emulated mass storage device, wherein the emulation of the keystrokes causes transfer, across the interface, of the driver for the second device from said emulated mass storage device.

3. The method of claim 2, wherein data passes through the interface according to a standard known as Universal Serial Bus.

4. The method of claim 2, wherein the mass storage device is a CD-ROM disk.

5. The method of claim 4, wherein data passes through the interface according to a standard known as Universal Serial Bus.

6. The method of claim 1, wherein data passes through the interface according to a standard known as Universal Serial Bus.

7. A peripheral device, comprising:

a processor; and an interface enabling said processor to communicate with a computer, wherein:

the computer, having a version of the Windows® operating system installed, automatically executes at least a portion of an instruction set in a file named autorun.inf that is stored on a mass storage device, a storage medium readable by he computer comprises a driver for the mass storage device, and upon receiving an identification of a device from said processor, the computer uses a driver for the identified device to establish communication, through said interface, with the identified device;

said processor transfers an identification of the mass storage device across said interface to the computer;

said processor emulates the mass storage device, the emulation comprising storing a file named autorun.inf, wherein said file comprises instructions that direct the computer to retrieve a driver for a second device from the mass storage device, said processor transmits the identification of the second device to the computer, and the peripheral device operates as the second device.

8. The system of claim 7, wherein said interface operates according to a standard known as Universal Serial Bus.

9. The system of claim 7, wherein the mass storage device is a CD-ROM drive.

10. The system of claim 9, wherein said interface operates according to a standard known as Universal Serial Bus.

11. A peripheral device comprising:

a processor; and an interface for enabling said processor to communicate with a computer, wherein:

a storage medium of the computer comprises a driver for a mass storage device, and upon receiving an identification of a device from said processor, the computer uses a driver for the identified device to establish communication, through said interface, with the identified device;

said processor transfers an identification of the mass storage device to the computer;

said processor emulates the mass storage device, the emulation comprising storing a driver for a second device, the driver for the second device is transferred from the mass storage device to the computer while the computer operates by using the Windows® operating system, said processor transmits an identification of the second device to the computer, and the peripheral device operates as the second device.

12. The system of claim 11, wherein said interface operates according to a standard known as Universal Serial Bus.

13. The system of claim 11, wherein the mass storage device is a CD-ROM drive.

14. The system of claim 13, wherein said interface operates according to a standard known as Universal Serial Bus.

15. A peripheral device, comprising:

a processor, and an interface for enabling said processor to communicate with a computer, wherein a storage medium of the computer comprises a driver for a keyboard, and a storage medium of the peripheral device comprises a driver for a second device, upon receiving an identification of a device from said interface, the computer uses a driver for the identified device to establish communication, through said interface, with the identified device;

said processor transfers an identification of the keyboard to the computer, and emulating keystrokes issued by the keyboard, thereby controlling the computer so that the driver for the second device is transferred to the computer, said processor transmits an identification of the second device to the computer, and the peripheral device operating as the second device.

16. The system of claim 15, wherein the processor further transfers an identification of a mass storage device to the computer, and emulates storing, on the mass storage device, the driver of the second device.

17. The system of claim 16, wherein the mass storage device is a CD-ROM drive.

18. The system of claim 17, wherein said interface operates according to a standard known as the Universal Serial Bus standard.

19. The system of claim 16, wherein said interface operates according to a standard known as the Universal Serial Bus standard.

20. The system of claim 15, wherein said interface operates according to a standard known as the Universal Serial Bus standard.

* * * * *